July 28, 1931.  E. HILGERS  1,816,374
PROCESS AND MACHINE FOR ROLLING RAW PLATE GLASS
Filed June 7, 1930
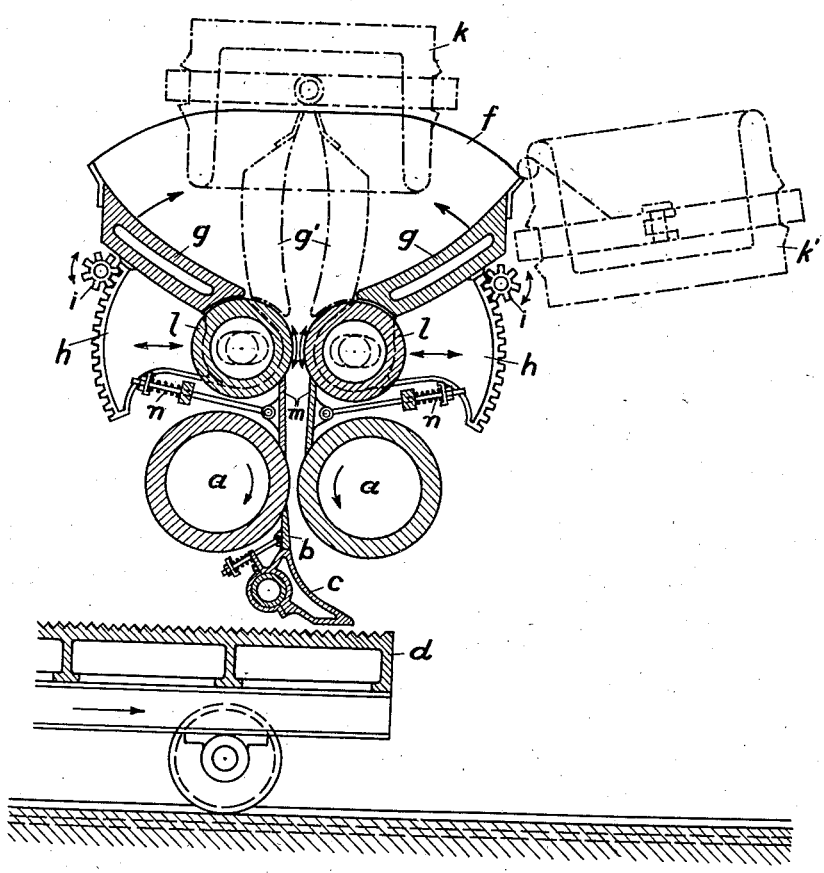
Inventor:
Ernst Hilgers
per
Attorney.

Patented July 28, 1931

1,816,374

UNITED STATES PATENT OFFICE

ERNST HILGERS, OF DUSSELDORF-OBERKASSEL, GERMANY, ASSIGNOR, BY MESNE ASSIGNMENTS, TO THE AMERICAN BICHEROUX COMPANY, A CORPORATION OF DELAWARE

PROCESS AND MACHINE FOR ROLLING RAW PLATE GLASS

Application filed June 7, 1930, Serial No. 459,786, and in Germany June 12, 1929.

This invention relates to the manufacture of raw plate glass in sheets and has, more particularly, reference to plate glass forming machines of the kind in which there is arranged above the forming mill proper a hopper into which the liquid glass mass is delivered and which has in its bottom a discharge slot through which a band or strip of glass is delivered to preliminary forming means, such as relatively adjustable plates or rolls, which give the band an initial thickness whereupon it is fed to the actual forming mill in which the band is given its final thickness. These known machines possess the following drawbacks. The walls of the hopper are generally in a fixed position, the longitudinal walls are comparatively steep and the hopper therefore has a correspondingly small width and can only receive a predetermined quantity of glass. It is very difficult to properly deliver the liquid glass mass to the hopper, especially to empty melting pots into the same. If it is, for instance, desired to empty a melting pot into such a hopper by turning it about its central axis as commonly practised, the pot must be positioned as a whole above the hopper in view of the narrow width of the same. Therefore, the glass mass has to fall through a considerable distance from the pot to the hopper bottom when being poured out and the result thereof is the formation of bubbles, eddies and of various shafts or layers in the glass mass which deteriorate the quality of the raw plate glass to be formed. On the other hand, the emptying of the pots by tilting them about their upper edge cannot be accomplished, because the hopper walls are too steep so that in the attempt of positioning the melting pot with its pouring edge near the upper edge of one of the hopper walls over which the pot should be emptied, the pot or the pot holding fork will strike against such wall. In a hopper with fixed walls the level of the glass mass and the pressure of the mass above the discharge slot constantly change during the discharge of the glass through such slot. As a result thereof, the glass mass will flow at a higher speed at the beginning of the rolling operation than in the course and at the end of the operation. If the peripheral speed of the forming rolls is not regulated accordingly during the operation, which of course is very difficult owing to short length of time required for the rolling, it will happen that, at the beginning of the operation, the hot glass strip accumulates in a certain mass on the forming rolls and owing to the increased contact area with the rolls produces deformations of the same which are liable to cause irregularities or unevenness of the glass sheets. It may also happen that the glass mass flows laterally over the initial and final forming means, thereby causing severe losses of glass. Towards the end of the discharge of the glass mass from the hopper the speed of discharge decreases owing to the decreasing pressure and the increasing solidification so much that the forming rolls will exert an undesired stretching action on the glass strip unless their speed is changed. Finally, with the known hoppers even if they are heated it will not be possible to avoid the adhering of glass to the hopper walls so that a remainder of glass will always be left in the hopper.

The invention has for its object to so improve the construction and manipulation of plate glass rolling machines of the kind stated that the inconveniences indicated are as much as possible avoided. To this end, the longitudinal or side walls of the hopper are made tiltable about their lower edges which define the glass discharge slot. This tiltability of the hopper walls allows to change the capacity of the hopper within vast limits, so that various quantities of glass can be filled into the hopper and sheets of various sizes be produced from the contents of the hopper. During the discharge of the glass mass from the slot of the hopper the tiltable walls can be gradually swung toward each other so that one and the same level of glass is maintained in the hopper almost till the end of the rolling operation. A uniform pressure is thereby maintained in the hopper above the discharge slot and, if the degree of liquidity of the glass mass remains unchanged, the discharge of the glass will take place at a uniform speed. If it should not be possible to keep the glass mass at a uniform degree of liquidity during the course of the rolling operation, the tiltable hopper walls during the rolling are brought closer to each other more rapidly so that the glass level in the hopper and the pressure above the discharge slot rise higher in accordance with the decrease of the degree of liquidity. In this way it is possible to attain a uniform speed of discharge of the glass mass so that the forming rolls proper can constantly be rotated with equal speed. The tiltability of the longitudinal walls of the hopper further allows of positioning the same at such a small incline that a melting pot can be readily lowered into the hopper and emptied at a low height above the hopper bottom by turning it about its central axis. When the hopper walls are at a small incline, a pot can also be positioned with its pouring edge near the upper edge of one of these walls without striking against the same and emptied over this edge by turning the pot about a horizontal axis located in or near the pouring edge. For regulating the width of the discharge slot the invention contemplates making the longitudinal walls relatively adjustable at their lower edges, so that special means for regulating or stopping the discharge are dispensed with. While in the known machines preliminary forming rolls are disposed at a certain distance below the hopper, the invention proposes to locate such rolls directly at the lower edges of the hopper side walls. In this case these rolls form the discharge slot and are adjustable together with the hopper walls. Preliminary forming rolls arranged in this way have the advantage that when rotated they keep the glass mass in the lower part of the hopper in motion and thereby prevent excessive cooling and adhering of the glass mass to the hopper walls near the discharge slot. By rotating these rolls in the direction of the discharge, the discharge is assisted in and a complete or almost complete emptying of the hopper rendered possible. By rotating the said rolls in the opposite direction the discharge of the glass mass can be stopped. Another object of the invention is to provide between the hopper or the preliminary forming rolls at the bottom of the hopper and the final forming rolls lateral closure plates. These plates prevent the glass from flowing laterally outwards between the two pairs of rolls and from heaping up too much on the forming rolls, whereby deformations of the latter might otherwise be produced due to the increased contact area between the glass and the rollers. Means are preferably provided for holding the closure plates with their upper and lower edges yieldingly against the rolls, thus causing them to act as strippers and prevent the glass from adhering to the rolls.

The accompanying drawing illustrates, by way of example, a vertical transverse section through a plate glass rolling machine constructed in accordance with the invention.

$a, a$ are the main forming rolls which give the glass sheets their final thickness. The sheets emerging from between the rolls $a$ pass over a stripper $b$ and a chute or guide member $c$ to travelling transporting tables $d$ which carry the sheets to the annealing ovens. Instead of these tables there may also be used conveying rollers or bands. As a modification, the rolling mechanism may be constructed for travelling movement and a stationary support used instead of the tables $d$. Arranged above the rolling mechanism is a hopper $f$ designed to receive the glass mass to be formed into plates. The side walls $g$ of the hopper are tiltable or swingable about their lower edges. The tilting or adjusting of the walls $g$ may, for example, be accomplished by means of toothed segments $h$ which are rigidly fastened to the walls and engaged by fixedly mounted pinions $i$, through which movement can be imparted to the segments and hopper walls. The full lines show the hopper walls $g$ in their extreme outer or open position, while the dot-and-dash lines $g'$ show them in their extreme inner position. When the hopper is fully open, a melting pot $k$ can be emptied within the hopper space by turning it around its central axis. As indicated at $k'$ the pot can also be emptied into the hopper over the upper edge of one of the walls $g$ by tilting it about a horizontal axis located in or near the pouring edge of the pot. Mounted at the lower edges of the longitudinal walls $g$ are rolls $l$ which form between each other the discharge slot for the glass mass and which serve to give the glass band or strip flowing to the main forming rolls $a$ an initial or preliminary shape. Irregularities or unevenesses that might be produced in the glass band between the rolls $l$ are equalized by the forming rolls $a$. For allowing the thickness of the band formed in the discharge slot to be regulated, the lower edges of the walls $g$ together with the rolls $l$ are made horizontally adjustable with relation to each other. $m$ are plates arranged to laterally close the space between the initial forming rolls $l$ and the forming rolls $a$. Springs $n$ or equivalent means yieldably draw the plates $m$ with their upper and lower edges against the rollers $l$, $a$. The plates $m$ act as strippers at the rolls preventing glass from being taken around by these rolls. It will be understood that the plates m prevent any flow of glass laterally between the rolls l and a as well as an accumulation of glass on the rolls a. Thereby, losses of glass are avoided, at the same time the contact area between the glass and the rolls a, a will be safely held within small limits so that deformations of the rolls a, a through the influence of the high temperature of the glass are avoided or reduced to a minimum which is no longer detrimental. The plates m, which may be subdivided in the axial direction of the rolls, are connected with the side walls g in such a manner that when the lower edges of the latter and the rolls l are adjusted horizontally, the plates will follow such adjustment. The rolls a, a are likewise adjustable with relation to each other for changing the final thickness of the glass band or sheets. The rolls l can be rotated in both directions.

The walls of the hopper f, the rolls l and a, the closure plates m and the chute c may be heated or cooled in any well-known manner.

The hopper is constructed so as to allow the described swinging or adjusting of the hopper walls g. It may have fixed end walls between which the side walls are movable. The construction may also be chosen so that one of the end walls is rigidly connected and movable with one of the side walls. Besides, both end walls may be formed integrally and be movable with one side wall, while the other side wall is adjustable between the end walls. To prevent glass from penetrating from the hopper through the joints between the hopper walls, the respective edges of the walls are provided with strippers similar to the strippers c or with other packing means.

Having thus described my invention, what I claim as new and desire to secure by Letters Patent, is:—

1. In a plate glass rolling machine, in combination cooperative plate forming rolls, a hopper above these rolls for receiving a mass of liquid glass, a slot defined by the lower edges of the side walls of the hopper and adapted to deliver to the forming rolls a strip of glass, and means for swinging the hopper side walls towards and away from each other about their lower edges.

2. In a plate glass rolling machine, in combination cooperative plate forming rolls, a hopper above these rolls for receiving a mass of liquid glass, a slot defined by the lower edges of the side walls of the hopper and adapted to deliver to the forming rolls a strip of glass, means for adjusting the side walls with their lower edges relatively to each other for regulating the thickness of the glass strip, and means for swinging the hopper side walls towards and away from each other about their lower edges.

3. In a plate glass rolling machine, in combination cooperative forming rolls, a hopper above these rolls for receiving a mass of liquid glass, a discharge slot in the hopper between the lower edges of the hopper side walls, cooperative preliminary forming rolls arranged at the lower edges of the side walls so as to project into the hopper and designed to delimit the width of the discharge slot, and means for swinging the side walls toward and away from each other about their lower edges.

4. In a plate glass rolling machine, in combination cooperative forming rolls, a hopper above these rolls for receiving a mass of liquid glass, a discharge slot in the hopper between the lower edges of the hopper side walls, cooperative preliminary forming rolls arranged at the lower edges of the side walls so as to project into the hopper and designed to delimit the width of the discharge slot, means for swinging the side walls toward and away from each other about their lower edges, and means for adjusting the side walls with their lower edges and with the preliminary forming rolls relatively to each other for varying the thickness of the glass strip discharged between them and fed to the forming rolls.

5. In a plate glass rolling machine, in combination cooperative forming rolls, a hopper above these rolls for receiving a mass of liquid glass, a slot defined by the lower edges of the side walls of the hopper and adapted to deliver to the forming rolls a strip of glass, lateral closure plates between the discharge slot and the forming rolls, means for swinging the hopper side walls towards and away from each other about their lower edges, and means for adjusting the side walls with their lower edges relatively to each other.

6. In a plate glass rolling machine, in combination a pair of cooperative forming rolls, a hopper above these rolls for receiving a mass of liquid glass, a glass discharge slot in the hopper between the lower edges of the hopper side walls, cooperative preliminary forming rolls at the lower edges of the side walls delimiting the width of the discharge slot and regulating the thickness of the strip of glass discharged, plates for laterally closing the space between the preliminary forming rolls and the forming rolls, means for yieldingly pressing these plates with their upper and lower edges against the said rolls so as to cause them to act as strippers, means for swinging the hopper side walls towards and away from each other about their lower edges, and means for adjusting the side walls with their lower edges and with the preliminary forming rolls relatively to each other for varying the thickness of the glass strip discharged between them and fed to the forming rolls.

7. A process of making raw plate glass in a rolling machine of the character described, consisting in delivering a mass of liquid glass into the feeding hopper, causing a strip of glass of regulable thickness to flow through the discharge slot of the hopper to the pass between a pair of forming rolls, giving the strip of glass its final shape by means of these rolls, and swinging the tiltable side walls of the hopper towards each other so as to maintain the liquid glass in the hopper at such a level that the discharge of glass through the hopper slot takes place at a uniform speed throughout the forming operation.

8. A process of making raw plate in a rolling machine of the character described, consisting in swinging the side walls of the hopper outwardly to a slightly inclined position, emptying the contents of a melting pot into the hopper, causing a strip of glass of regulable thickness to flow through the discharge slot of the hopper to the pass between a pair of forming rolls, giving the strip of glass its final shape by means of these rolls, and gradually swinging the side walls of the hopper towards each other during the forming operation.

9. A process of making raw plate in a rolling machine of the character described, consisting in swinging the side walls of the hopper outwardly to a slightly inclined position, positioning a melting pot with its pouring edge near the upper edge of one of the side walls, emptying the pot over this wall into the hopper by tilting it about a horizontal axis located near its pouring edge, causing a strip of glass of regulable thickness to flow through the discharge slot of the hopper to the pass between a pair of forming rolls, giving the strip of glass its final shape by means of these rolls, and gradually swinging the side walls of the hopper towards each other during the forming operation.

In testimony whereof I have signed my name to this specification.

ERNST HILGERS.